United States Patent [19]
De Oliveira et al.

[11] Patent Number: 5,836,784
[45] Date of Patent: Nov. 17, 1998

[54] ELECTRICAL DISTRIBUTION WIRING SYSTEM

[75] Inventors: David De Oliveira, Dijon; Pascal Hubben, Arcelot; Jean-Pierre Thierry, Arc-sur-Tille, all of France

[73] Assignee: Schneider Electric SA, Boulogne Billancourt, France

[21] Appl. No.: 782,919

[22] Filed: Jan. 13, 1997

[30] Foreign Application Priority Data

Jan. 19, 1996 [FR] France .................................. 96 00837

[51] Int. Cl.⁶ .................................................. H01R 11/00
[52] U.S. Cl. ........................ 439/502; 174/99 B; 439/906
[58] Field of Search ............................... 439/95, 210, 213, 439/502, 610, 906; 174/99 B, 70 B

[56] References Cited

U.S. PATENT DOCUMENTS

| | | | |
|---|---|---|---|
| 2,879,319 | 3/1959 | Carlson et al. | 439/213 |
| 4,599,483 | 7/1986 | Kuhn et al. | 439/502 |
| 4,944,687 | 7/1990 | Mailly et al. | 439/207 |

FOREIGN PATENT DOCUMENTS

| | | |
|---|---|---|
| 0 692 855 | 1/1996 | European Pat. Off. . |
| 2.094.609 | 2/1972 | France . |
| 2 353 794 | 12/1977 | France . |
| 2 626 723 | 8/1989 | France . |

*Primary Examiner*—Neil Abrams
*Assistant Examiner*—Barry M. L. Standig
*Attorney, Agent, or Firm*—Oblon, Spivak, McClelland, Maier & Neustadt, P.C.

[57] ABSTRACT

Electrical distribution wiring system comprising a flexible element equipped at each extremity with a junction member to a rigid element.

The junction member 30 includes a retaining piece 40 and a positioning end-piece 50 of the flexible conductors, as well as a metallic sleeve 60 covering and holding in place the end-piece and the retaining piece.

13 Claims, 3 Drawing Sheets

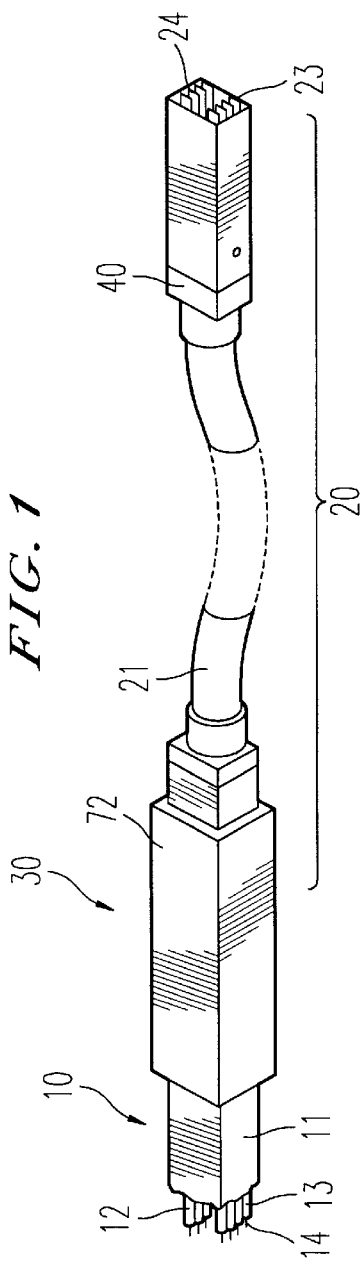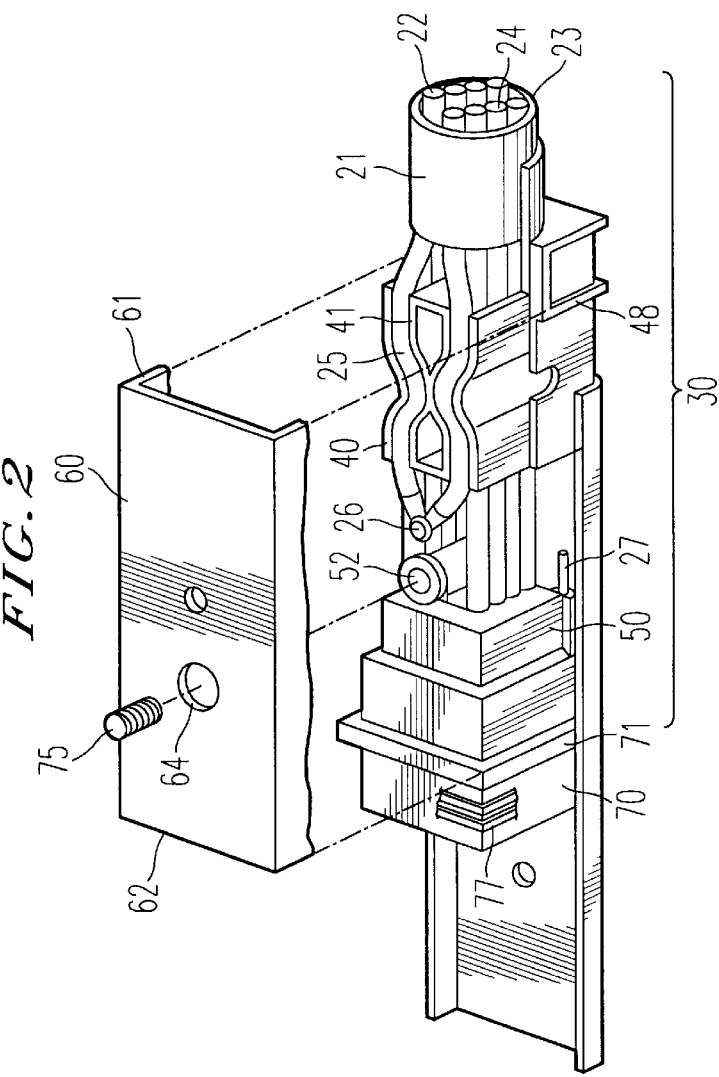

ELECTRICAL DISTRIBUTION WIRING SYSTEM

BACKGROUND OF THE INVENTION

1. Field of the Invention

This invention concerns an electrical distribution wiring system which may be composed by joining end to end several elements each housing in an envelope a conductor unit consisted of parallel electrical conductors and comprising a flexible element interposable between other elements.

2. Discussion of the Background

The use of a flexible element in such a wiring system is known for the purpose of connecting mechanically and electrically two non-aligned sections of wiring system to each other.

A flexible element for electrical wiring system is described for example in patent FR-2 626 723.

It is observed that the deformation communicated to the conductors when the flexible element is bent during assembly of the wiring system may lead to serious faults in positioning the bare extremities of the conductors, for it so happens that these extremities are required to cooperate perfectly with fixed connection clamps in order to ensure the electrical continuity of the wiring system.

SUMMARY OF THE INVENTION

The invention aims to provide, in a distribution wiring system, a simple and resistant mechanical and electrical junction of a flexible element with a neighboring element.

According to the invention, the flexible element includes a tubular envelope which houses an array of flexible conductors and includes at each extremity a junction member to another element of the wiring system, this junction member having a retaining piece fitted with angled housings in which are inserted the flexible conductors, a positioning end-piece for the bare extremities of the flexible conductors, and a sleeve covering and holding in place the end-piece and the retaining piece.

The reliability of the electrical connection is the result of the combination of the retaining piece, the positioning end-piece and the maintaining sleeve.

The retaining piece may advantageously comprise firstly a coupling flange equipped with sealing grooves for the flexible tubular envelope, and secondly a longitudinal stop collar for an extremity of the sleeve. At its other extremity, the sleeve may be positioned, stopped, against a collar of an electrical connection piece on which is also stopped an extremity of the sheath of the rigid element to be joined and the sleeve; the connection piece and the extremity of the sheath are then covered by a fishplating shell which holds them assembled. The sleeve may also be constituted by the extremity of the envelope of the neighboring rigid or flexible element.

BRIEF DESCRIPTION OF THE DRAWINGS

The ensuing description of a non limitative embodiment example of the invention, with reference to the accompanying drawings, explains the characteristics and results of said invention.

FIG. 1 represents a partially exploded perspective view of part of a wiring system conforming to the invention.

FIG. 2 shows a perspective of a fishplating region of a flexible element of the wiring system.

DESCRIPTION OF THE PREFERRED EMBODIMENT

Figure 3:
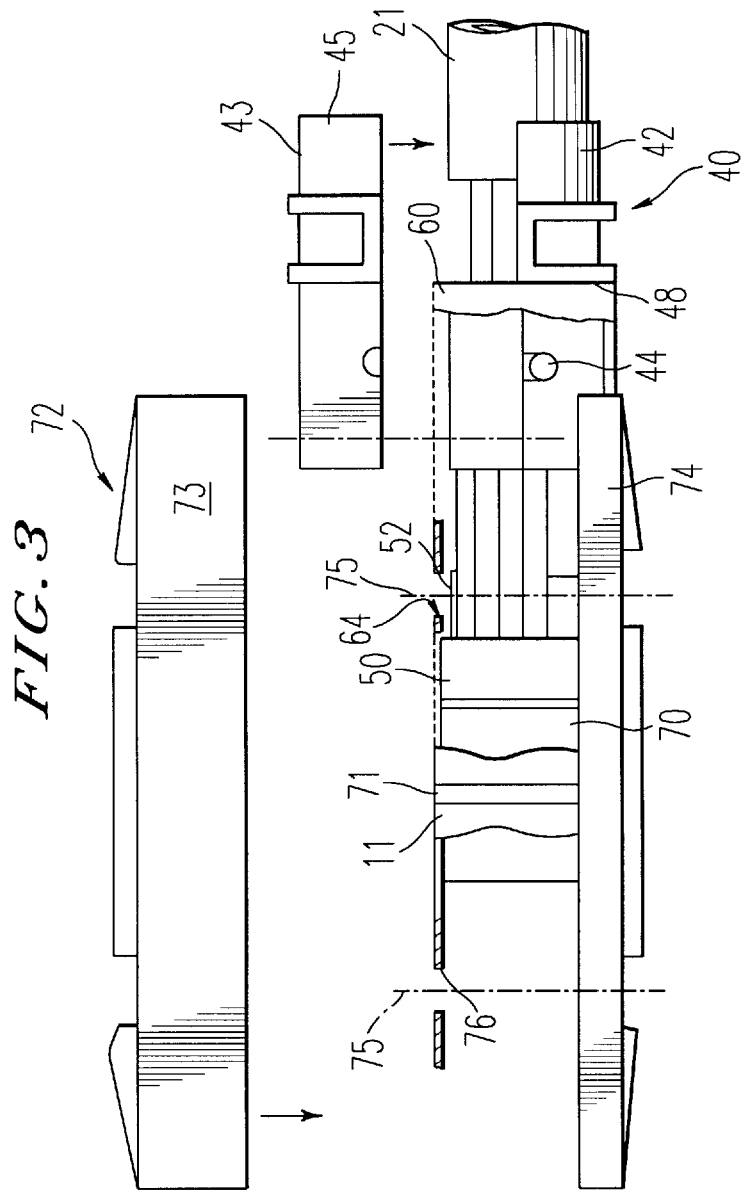
FIG. 3 is a side view of this region.
Figure 4:
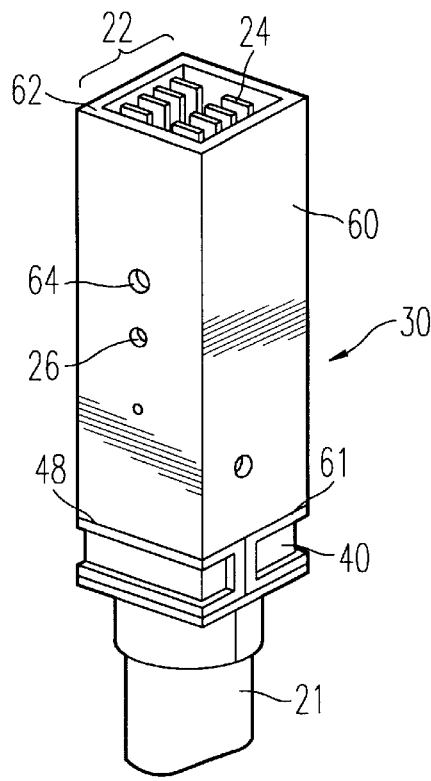
FIG. 4 shows a perspective view of the sleeved extremity of a flexible element.

The electrical distribution wiring system represented in the figures includes prefabricated rigid elements 10 comprising a tubular rigid metallic envelope 11 of determined length in which are inserted one or two arrays 12, 13 of electrical supply conductors 14 and, if required, conductors of weak currents, for example a liaison bus. For the purpose of adapting to a change of direction of the wiring system, a prefabricated flexible element 20 is inserted for example between two rigid elements such as 10. The prefabricated flexible element comprises a flexible, tubular envelope 21, smooth or undulating, and in this envelope consists of flexible material, one or two flexible arrays 22, 23 of electrical supply conductors 24, and, if required, conductors 27 of weak currents; the flexible element comprises at each of its extremities a junction member 30 allowing the mechanical junction of the envelopes 11, 21 and the electrical connection of the conductors 14, 24. In the embodiment example represented, the electrical conductors 24 are constituted by round-section wires 24a enveloped by insulating tubular sheaths 24b and assembled in arrays. The arrays 22, 23 of conductors 24 of the flexible element are cut longitudinally in 24c in the middle region of said element while remaining joined in its end regions, in such a way as to facilitate the play of the conductors in the middle region and, by contrast, to stiffen the arrays in the end regions.

Each junction member 30 includes a retaining piece 40 associated with a positioning end-piece 50 and a covering sleeve 60. The retaining piece 40 is designed to hold in place the end regions 24d of the conductors 24, in particular when said conductors are submitted to tensile or torsional stress consecutive to flexion of the envelope 21; to this end, the piece 40 comprises angled housings 41, for example in the form of lyres (see FIG. 2), and, if required, other maintaining means. The retaining piece 40 is an insulating material and consists of a body 42 comprising the housings 41 and a cover 43 fixed to the body by any appropriate means, for example rivets or screws 44; for the purposes of clarity, the cover 43 is not represented in FIG. 2. The body and the cover are equipped with half-flanges which join together in a cylindrical flange in which the extremity of the flexible envelope 21 is coupled; ribs and grooves 47 ensuring the sealing of this coupling are provided inside the flange.

Figure 5:
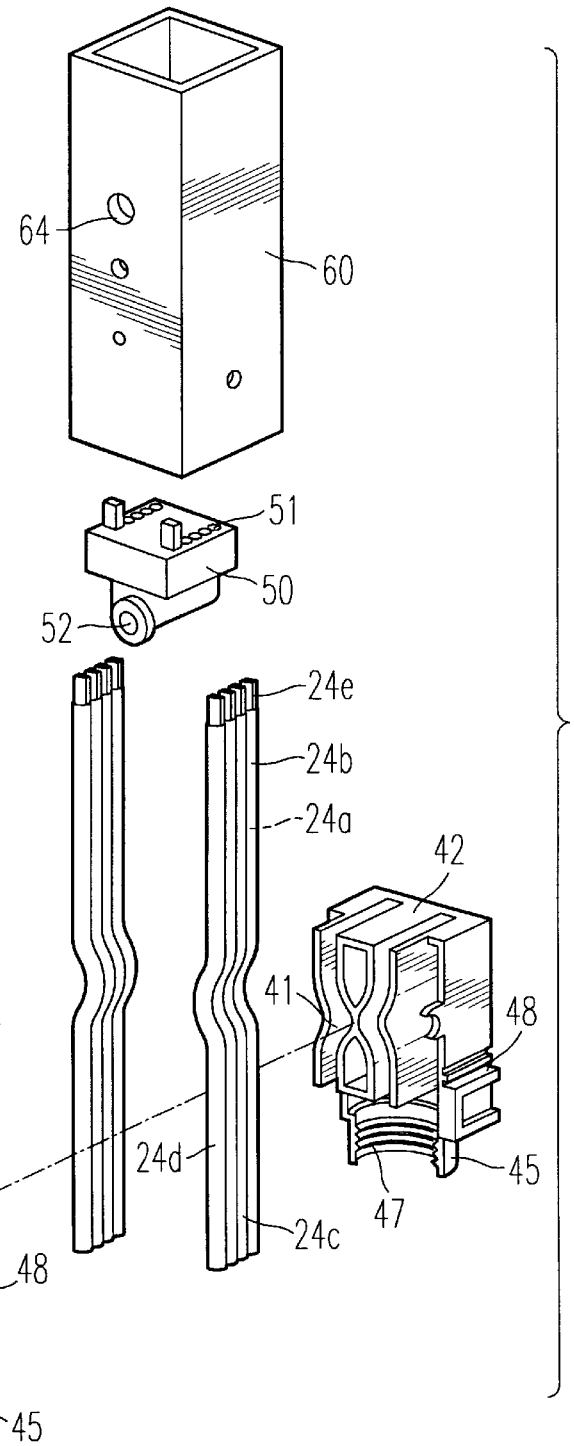
FIG. 5 is an exploded perspective view of this extremity.

The positioning end-piece 50 is an insulating material and includes traversing longitudinal openings 51 (see FIG. 5) in which the conductors 24 are inserted in such a way that the bared and flattened extremities 24e of said conductors are presented in the required position to the non-represented plastic interconnection clamps, housed in an insulating connection piece 70. The plastic clamps ensure the connection of each conductor 24 to the corresponding conductor 14 of the neighboring rigid element 10. Ground continuity conductors 25 are provided in the flexible envelope 21 for connection to the sleeve 60 by a connection point 26. Conductors 27 of a control or command bus may also be provided. The covering sleeve 60 is metallic and tubular and of square or rectangular section; it has two extremities 61, 62 and is coupled on the retaining piece 40 until the extremity 61 is stopped longitudinally against a shoulder 48 of the piece 40; at its other extremity 62, the sleeve 60 is stopped against a collar 71 provided on the exterior and in the middle of the connection piece 70. The sleeve 60 is assembled to the retaining piece by a bolt or a rivet 44. The extremity of the rigid metallic envelope 11 may be applied, stopped, against the collar 71 of the piece 70, on the other side of the piece, said rigid metallic envelope being tubular and of the same section as the covering sleeve 60 and housing an end-piece similar to the end-piece 50 in order to present the extremities of the conductors 14 to the connection clamps.

Alternatively, the sleeve 60 may simply be constituted by the extremity of the tubular envelope 11 of the neighboring wiring system element 10.

A fishplating shell 72, consisted of two pieces 73, 74 assembled to each other, covers part of the retaining piece 40, the positioning end-piece 50, the covering sleeve 60, the connection piece 70 and the end zone of the rigid envelope 11. The two pieces 73, 74 of the shell 72 are assembled by means of bolts 75 which cross firstly shafts 52 made in the positioning end-pieces 50 and secondly apertures 64 of the sleeve 60 and 76 of the rigid envelope. As a result of the fixing of the sleeve in the shell, the retaining piece, fixed in the sleeve, is also immobilized. Sealing grooves 77 may be made on the connection piece 70 on both sides of the stop collar 71; in this way, improvements are made to the sealing assembly of the rigid envelope 11 and of the sleeve 60 on the piece 70.

In the embodiment presented, the junction members 30 located at the two extremities of the flexible element are identical. They may also be differentiated with a view to providing a male-female type interlocking assembly, when the extremities of the envelopes of the rigid elements are themselves arranged to permit such an assembly.

We claim:

1. Electrical wiring system which may be composed by joining end to end several elements each housing a conductor unit consisted of several parallel electrical conductors and comprising a flexible element interposable between other elements having a tubular envelope, the flexible element including:
   a flexible tubular envelope which houses an array of flexible conductors,
   at each extremity, a junction member to another element, characterized in that the junction member includes:
      a retaining piece equipped with channels housings in which the flexible conductors are housed,
      a positioning end-piece for the bare extremities of the flexible conductors, and
      a sleeve covering and holding in place the end-piece and the retaining piece.

2. Wiring system according to claim 1, characterized in that the retaining piece has a coupling and sealing flange for the flexible tubular envelope and a shoulder with longitudinal stop for the sleeve.

3. Wiring system according to claim 1, characterized in that the flexible conductors of the array are dissociated from each other in the middle region of the flexible tubular envelope and are joined together in its end regions.

4. Wiring system according to claim 1, characterized in that the covering sleeve is housed in a fishplating shell in which it is maintained by a threaded fastener of the positioning end-piece.

5. Wiring system according to claim 1, characterized in that the covering sleeve has a section identical to that of a neighboring rigid metallic envelope, the sleeve and the rigid envelope being stopped on both sides of a collar of a connection piece covered by a fishplating shell.

6. Wiring system according to claim 1, characterized in that the covering sleeve is constituted by the extremity of the tubular envelope of a neighboring wiring system element to be joined.

7. Wiring system according to claim 1, comprising said sleeve joining the end-piece and the retaining piece.

8. An electrical wiring system which may be composed by joining end to end several elements each housing a conductor unit consisted of several parallel electrical conductors and comprising a flexible element interposable between other elements having a tubular envelope, the flexible element including:
   a flexible tubular envelope which houses an array of flexible conductors,
   at each extremity, a junction member to another element, characterized in that the junction member includes:
      a retaining piece equipped with channels in which the flexible conductors are housed, the retaining piece having a shoulder with a longitudinal stop,
      a positioning end-piece for the bare extremities of the flexible conductors, and
      a sleeve covering and holding in place the end-piece and the retaining piece and being positioned against said shoulder.

9. An electrical system according to claim 8, comprising said retaining piece having a sealing flange for the flexible tubular envelope.

10. An electrical wiring system which may be composed by joining end to end several elements each housing a conductor unit consisted of several parallel electrical conductors and comprising a flexible element interposable between other elements having a tubular envelope, the flexible element including:
    a flexible tubular envelope which houses an array of flexible conductors,
    at each extremity, a junction member to another element, characterized in that the junction member includes:
       a retaining piece equipped with channels in which the flexible conductors are housed,
       a positioning end-piece for the bare extremities of the flexible conductors,
       a sleeve covering and holding in place the end-piece and the retaining piece, and
       a fishplating shell in which the covering sleeve is housed.

11. A wiring system according to claim 10, wherein the covering sleeve is fixed to the positioning end piece.

12. A wiring system according to claim 10, characterized in that the covering sleeve has a section identical to that of a neighboring rigid metallic envelope, the sleeve and the rigid envelope being stopped on both sides of a collar of a connection piece covered by the fishplating shell.

13. A wiring system according to claim 10, characterized in that the covering sleeve is constituted by the extremity of the tubular envelope of a neighboring wiring system element to be joined.

* * * * *